Figure 1:
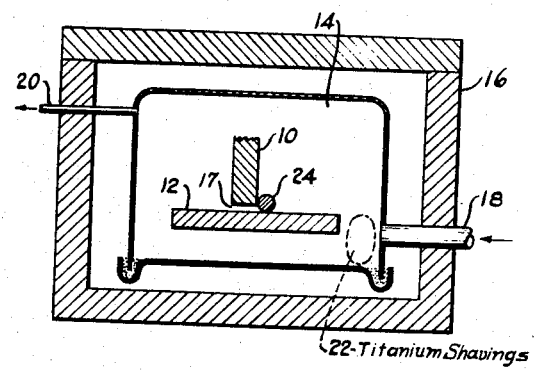

Dec. 1, 1959   B. S. BLUM ET AL   2,914,848
METHOD OF BRAZING TITANIUM
Filed Jan. 11, 1957

INVENTORS
BERNARD S. BLUM
EDWARD J. PHILIPPS
BY
ATTORNEY

United States Patent Office 2,914,848
Patented Dec. 1, 1959

2,914,848

METHOD OF BRAZING TITANIUM

Bernard S. Blum, New York, N.Y., and Edward J. Philipps, Fair Lawn, N.J., assignors to Curtiss-Wright Corporation, a corporation of Delaware Application January 11, 1957, Serial No. 633,646

4 Claims. (Cl. 29—494)

This invention relates to brazing and is particularly directed to an alloy and method for brazing titanium and titanium base alloys together with brazed joints made thereby.

The word "titanium" is used herein in a broad sense so as to include titanium base alloys as well as titanium itself.

Brazing titanium is difficult because many brazing alloys form brittle intermetallic compounds with titanium at the faces of the brazed joint. Other brazing alloys diffuse so rapidly into titanium that the brazing time must be very short and accurately controlled to prevent excessive erosion of the titanium and to prevent the formation of a brittle diffused layer at the brazed joint. It is also essential that the brazing temperature be sufficiently low that the physical properties of the titanium are not adversely affected by the brazing operation.

An object of the present invention comprises the provision of an alloy and method for brazing titanium to provide a strong and ductile brazed joint, the brazing alloy having the properties such that it readily wets the base metal, it does not readily diffuse into or erode the base metal, it does not require special preparation of the base metal other than normal cleaning, and the brazing operation can be carried out at temperatures sufficiently low so as not to adversely affect the physical properties of the base metal.

Applicants have found that titanium parts can be brazed together in an inert environment with a brazing alloy of silver, aluminum and tin to provide a strong and ductile brazed joint.

Figure 2:
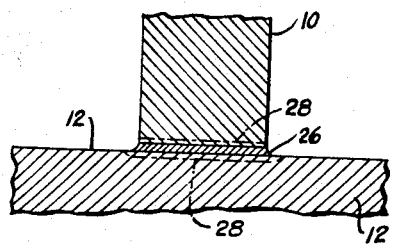

Other objects of the invention will become apparent upon reading the annexed detailed description in connection with the drawing in which:

Fig. 1 is a diagrammatic sectional view showing a brazing furnace with the brazing invention of the invention being carried out therein; and Fig. 2 is a sectional view of a brazed joint made in accordance with the invention.

Titanium (Ti) has previously been brazed with silver (Ag) in an inert environment. Such a brazed joint is ductile because the Ti—Ag intermetallic compounds formed in the joint are relatively ductile. However the brazing temperature with silver as the brazing alloy is quite high, being approximately 1800° F., and at this temperature the rate of diffusion of the silver into the titanium base metal is quite rapid.

It has been found that both aluminum (Al) and tin (Sn) may be added to silver to provide an Ag—Al—Sn alloy having a lower melting temperature. Thus from 1% up to 6 percent aluminum and from 1% up to 20% tin may be added to silver to provide a ductile brazing alloy which can be used to braze at 1600° F. Also, the addition of the tin to the silver apparently substantially reduces the rate at which the alloy diffuses into the titanium base metal during the brazing operation. This reduction in the rate of diffusion of the brazing alloy into the base metal is believed to be the reason for the consistently good results obtained with this Ag—Al—Sn brazing alloy. Best results were obtained with a brazing alloy having 1–4 percent tin and 2–5 percent aluminum.

In accordance with the invention the titanium parts to be brazed together are first cleaned. No special cleaning procedure is required however since it is only necessary to remove scale and grease prior to the brazing operation. The surfaces to be joined together are disposed in side-by-side relation with a clearance of 0.001 to 0.005 inch therebetween. This small clearance is such as results from bringing surfaces having an average or normal ground finish into contact.

To prevent oxidation of the titanium the brazing operation is carried out in an environment inert or non-oxidizing to titanium. Such an environment can be provided in a furnace by using argon or helium or by evacuating the furnace. In addition suitable fluxes may be used to provide such an environment.

In Fig. 1, the parts 10 and 12 to be brazed together are disposed within a sealed chamber 14 which in turn is disposed within a furnace 16. The surfaces to be brazed together are disposed in side-by-side relation with a clearance 17 therebetween. This clearance has been exaggerated in the drawing for purpose of illustration. Argon or helium is supplied to the chamber 14 through a passage 18 to provide an inert atmosphere or environment within the chamber for the brazing operation. A restricted vent 20 is provided to insure that substantially all air is purged from the chamber 14. In addition clean titanium shavings 22 preferably are placed in the furnace to absorb any residual hydrogen, oxygen or nitrogen in the furnace.

The brazing alloy 24 is placed adjacent the junction of the parts 10 and 12 in the usual manner and the parts are brazed together at a temperature of approximately 1600° F. Because of the slow rate of diffusion of the brazing alloy into the base metal the actual brazing time is not critical. Accordingly even if the brazing operation is continued longer than necessary for the alloy to completely fill the joint there is no serious erosion of the parts 10 and 12 by the brazing alloy nor is there any substantial diffusion of the brazing alloy into the base metal. It has been found that diffusion of the brazing alloy into the base metal can readily be limited to a depth of no more than 0.001 inch.

Fig. 2 illustrates a brazed joint of the parts 10 and 12. The joint is indicated at 26 and the depth of the diffusion zones into the parts 10 and 12 is indicated by the dot and dash lines 28.

The brazed joint 26 made in accordance with the invention is strong and ductile and has good high temperature properties. In addition, the above-described brazing alloy of silver, aluminum and tin permits the brazing operation to be carried out at the relatively low temperature of 1600° F. whereby the brazing operation does not adversely affect the physical properties of the base metal.

Although the invention has been specifically provided for brazing titanium parts it should be obvious that the Ag—Al—Sn alloy can be used for brazing together other metallic parts which are wet by the brazing alloy, such as most steels. Thus the brazing alloy can be used for brazing a titanium part to a steel part, for brazing together two steel parts as well as for brazing together two titanium parts.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. An alloy for use in brazing consisting of 1-4 percent tin, 2-5 percent aluminum with the balance silver.

2. The method of joining a titanium part to another part comprising the steps of disposing the parts in abutting relation with a brazing alloy adjacent to their abutting surfaces, said alloy consisting of 1-20 percent tin, 1-6 percent aluminum with the balance substantially all silver, and then brazing said parts together at a temperature of approximately 1600° F.

3. The method of joining a titanium part to another part comprising the steps of disposing the parts in abutting relation with a brazing alloy adjacent to their abutting surfaces, said alloy consisting of 1-4 percent tin, 2-5 percent aluminum with the balance silver, and then brazing said parts together at a temperature of approximately 1600° F.

4. The method of joining a titanium part to another part comprising the steps of disposing the parts in abutting relation with a brazing alloy adjacent to their abutting surfaces, said alloy consisting of 1-4 percent tin, 2-5 percent aluminum with the balance silver, and then brazing said parts together at a temperature of approximately 1600° F. and in an inert environment.

References Cited in the file of this patent

UNITED STATES PATENTS

| | | |
|---|---|---|
| 2,376,578 | Dean | May 22, 1945 |
| 2,714,760 | Boam | Aug. 9, 1955 |

FOREIGN PATENTS

| | | |
|---|---|---|
| 297,165 | Great Britain | Sept. 20, 1928 |

OTHER REFERENCES

WADC Technical Report 52-313, part 2, December 1953, Wright Air Development Center, Wright-Patterson Air Force Base, Ohio.